Figure 1:
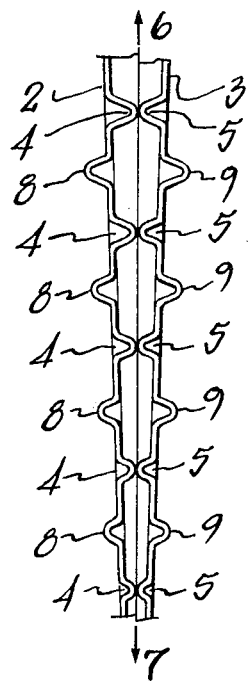

United States Patent [19]

Barrington

[11] 4,268,290
[45] May 19, 1981

[54] AIR FILTERS
[75] Inventor: Ross B. Barrington, Berkhamstead, England
[73] Assignee: Engineering Components Limited, England
[21] Appl. No.: 44,294
[22] Filed: May 31, 1979
[30] Foreign Application Priority Data
  May 31, 1978 [GB] United Kingdom .............. 25329/78
[51] Int. Cl.³ ............................................ B01D 46/10
[52] U.S. Cl. .................................... 55/521; 210/493.1
[58] Field of Search ......................... 55/500, 521, 498; 210/493 R

[56] References Cited

U.S. PATENT DOCUMENTS

| | | | |
|---|---|---|---|
| 2,936,855 | 5/1960 | Allen et al. | 55/521 |
| 2,968,361 | 1/1961 | Buckman | 55/500 |
| 3,531,920 | 10/1970 | Hart | 55/521 |

FOREIGN PATENT DOCUMENTS

| | | | |
|---|---|---|---|
| 2034669 | 1/1972 | Fed. Rep. of Germany | 55/521 |
| 840757 | 7/1960 | United Kingdom . | |
| 1507824 | 4/1978 | United Kingdom . | |

*Primary Examiner*—Bernard Nozick
*Attorney, Agent, or Firm*—William A. Drucker

[57] ABSTRACT

A pleated paper filter element has the configuration of the frustrum of a cone with the pleats extending lengthwise of the sloping wall of the cone and has pleat separation dimples embossed into the paper from which the element is made, the height of said dimples being graduated lengthwise of the element so as to provide controlled pleat separation over at least most of the length of the element.

5 Claims, 2 Drawing Figures

AIR FILTERS

This invention relates to pleated paper elements of the kind used in air cleaners for internal combustion engines.

The paper used to make gas filter elements has to meet conflicting requirements in that it must be both readily permeable and yet act as an efficient filter for particulate matter of fairly small dimensions. Whilst plain, untreated paper could be used, it has been found to have too short a service life, due to lack of dimensional stability and to occlusion of the pores in it by particulate matter, sometimes known as the "dust cake". Much better performance is achieved by use of a "treated" paper in which a thermoset resin treatment is used to confer stiffness, i.e. dimensional stability and also the paper is treated with a non-drying liquid. Examples of such treatments are more fully described in the specifications of British Pat. Nos. 875677 and 909581; the treatment liquid used is generally selected so that it at least moistens both the paper and the particulate matter.

Pleated paper elements are widely used for gas filtration because the pleated construction very greatly increases the total surface area of paper which can be accommodated in a given size of filter casing. However, the use of pleated paper presents problems in that if the pleats are so close together that dust laden air cannot penetrate at least most of the depth of the pleats, the available paper area will be effectively reduced. Also, because paper is of limited strength and rigidity, especially when pleated, distortion and/or relative displacement of the walls of the filter element can occur under the pulsating flow conditions encountered in internal combustion engines. This usually has the effect of reducing the available paper area by reducing the separation between at least some of the pleats, so that dust laden air cannot fully penetrate between them. The problem is if anything exacerbated by the use of treated paper, since the larger dust particles tend to stick to the surface of the paper instead of becoming embedded in (and therefore occluding) the pores of the paper of the paper. If the pleat spacing is insufficient, this results in occlusion of the pleats themselves, long before their maximum dust retaining capacity is attained.

It is common practice to seek to overcome these difficulties by embossing pleat separation dimples into the paper before or during the pleating operation. An example of this is found in British patent specification No. 840,757. In the alternative, the paper may simply be slightly corrugated throughout its length, prior to pleating. This has been standard practice for many years, but it affords little or no actual control of pleat separation. The gaps between the pleats are too small in general terms for optimum element life to be achieved. However, all these difficulties are considerably exacerbated when a "tapered" filter element is used. Such generally conical elements are described in UK Specification No. 1,507,824, which discloses a pleated paper element having the configuration of a frustum of a cone with the pleats extending lengthwise down the sloping wall of the cone. Such an element will be referred to as a "tapered filter element" in this specification.

According to the present invention the pleats of a pleated paper tapered filter element (as hereinbefore defined) are provided with pleat separation dimples whose height relative to the plane of the paper is graduated lengthwise of the element so as to provide controlled pleat separation over at least most of the length of the element.

Preferably, the pleat separation dimples on that side of the pleated paper which is to be, in use, the outer surface of the tapered element are in the form of tapered indents, a tapered indent for present purposes being defined as a continuous deformation extending over at least a major portion of the pleat depth to form thereby a ridge whose height relative to the plane of the paper decreases progressively towards the bottom of the pleat. It will be understood that the pleat depth refers to the depth of individual pleats, not to the width of the paper from which they are made. Likewise the bottom of a pleat is at the origin of the included angle between two adjacent pleat wall portions.

To provide pleat separation on the inside of the tapered filter element, it is preferred that the dimples are a constant height throughout the depth of the pleat, although this constant height will of course be graduated lengthwise of the pleat. It has been observed that this improves the performance of the element, particularly when the flow through it is from the outside to the inside of the cone. The latter flow direction is the one normally used and is as described in Specification No. 1,507,824 referred to earlier. Preferably the dimples of facing pleat portions are aligned to meet in a continuous or discontinuous line which extends from the mouth, or closely adjacent the mouth of the pleat to its bottom. This reduces the height of the dimples needed in any one wall portion for a given separation between facing wall portions and makes for easier manufacture.

The spacing of the pleat separation dimples is not critical provided that there are enough dimples to maintain the desired pleat separation and that they are not so close together as to create undue flow restriction.

In practice, a spacing of up to about 1 cm between adjacent dimples projecting in the same direction has proved satisfactory.

The height of the preferred tapered indents may be up to about 1 mm relative to the plane of the paper, where opposed indents are aligned to meet in the preferred crest-to-crest relation. Their abutting crest regions may be of the order of 1-3 mm wide. A typical width at the base of an indent would be about 5 mm. Under these preferred conditions, the combination of a treated paper with a tapered element configuration allows the paper to achieve optimum service life in terms of (a) dust holding capacity and (b) pressure drop across the filter. The latter is highly significant, since it affects the volume through-put of the filter and in an automotive context, the efficiency of the carburation system.

The use of graduated height pleat separation dimples according to the invention results in a tapered element in which pleat separation is accurately controlled over most of the pleat length and depth. It also results in an element of exceptional rigidity under pulsating flow conditions. However, despite the apparently significantly increased extent of contact between the pleats, it has been found that a tapered element incorporating the graduated height pleat separation dimples of the invention has a much greater capacity for dust adsorption before excessive pressure drop signals the end of the useful life of the element.

It should be understood that in the present context, a tapered element need not exhibit a high degree of taper for pleat separation to become an issue in determining element dust holding capacity and/or pressure drop across the filter. Even an "optimised" tapered element featuring the pleat separation dimples of this invention may appear to have too much paper (too many pleats) at its relatively narrow end and too little paper (too few pleats) at its relatively wide end. The degree of taper is determined by the difference in diameter of the two element ends in question and it has been found that as little as about 1 or 1.5 cm difference on an element length of say 25 cm and average diameter 18 or 20 cm can give rise to pleat separation problems, unless the techniques of the present invention are adopted.

It is necessary to use the pleat separation techniques just discussed. It is not enough to use the uniform indents of the prior art, since they give insufficient control of pleat separation at the relatively wide diameter end of the element, even with such a small degree of element taper. This leads to "bunching" of the pleats and a consequential reduction in dust holding capacity.

For example, in one high volume air cleaner for a heavy duty internal combustion engine, the target life (i.e. limit of acceptable pressure drop) is reached when about 4000 gm of dust had been absorbed on the conventional tubular pleated paper element. "SAE fine" dust was used.

By contrast, a tapered element having the graduated height pleat separation dimples of the present invention absorbed almost 600 gm of dust before the same target life was reached.

A further advantage of the invention has been found to lie in the exceptional rigidity referred to above. Hitherto, tapered elements have been stabilised by using adhesives to adhere radially inner most and/or outermost portions of the pleats to the inner and outer perforated sheet metal supports usually employed. Spiral bands of adhesive have been used for this and whilst the technique is moderately successful, it tends to obscure at least some of the paper area, thereby reducing its dust absorbing capacity. It can also give too closely bunched pleats, if the element assembly is not carried with very great care.

The invention includes an air filter fitted with a filter element according to the invention.

In the previously mentioned example, a tapered element constructed in accordance with the invention was compared with a conventional tubular element made from the same paper. Both were tested at a flow of 11.3 cu meters/minute and both exhibited an initial pressure drop of 21.5 cm of water. Standard dust was introduced into the inlet air streams at a constant rate and the pressure drop across the elements was monitored. When it reached 55.8 cm of water, (which was the normal laboratory test life of the conventional element at such a flow rate), the tests were stopped. This normal test life pressure drop was reached after 6½ hours in the case of the conventional filter element and after 10 hours in the case of the tapered element incorporating the graduated height pleat separation dimples of the invention. Both elements were weighed after the tests and it was found that the conventional element had absorbed roughly 4000 gm of dust; but the element with the graduated height dimples had absorbed roughly 6000 gm of dust. As both elements had the same total area of paper in them, the improvement in dust holding capacity achieved by using a tapered element with graduated height dimples was very significant, indicating that either a greater flow rate could be used for the same service life, or alternatively, a much greater life could be achieved, both without increasing the paper area and/or element size.

The invention is further illustrated by the following comparative examples—

A conventional parallel sided tubular filter element was made from a standard, treated filter paper. The paper was slightly corrugated lengthwise before pleating into 2.5 cm deep pleats and assembly into a tube 19 cm in diameter (external) and of length 25 cm. This was installed in a filter casing and its conventional rating was 7.9 cubic meters/minute throughput at an initial pressure drop of 100 mm water gauge. On testing, at its rated throughput, the element retained 355 grams of standard dust ("SAE fine dust") before the test was terminated on reaching a pressure drop of 505 mm water gauge, the latter signalling the end of the useful service life of the element.

The same type of filter paper was then made up into a tapered filter element to fit the same overall size of filter casing. However, the paper was indented in accordance with the present invention and not corrugated prior to pleating. The depth of the pleats was increased to 3.8 cm to take advantage of the increased diameter of the relatively wide end made possible by using a tapered element.

Despite the increased pleat depth, the total area of paper in the filter element had to be reduced, largely because of the much better (greater and more uniform) pleat separation achieved. The initial pressure drop was the same, but on testing with the same dust and at the same 7.9 cubic meter/minute thoughput to the same final pressure drop of 505 mm of water, the element had retained no less than 1275 grams of dust, an improvement of over three and a half times on the conventional element.

In a further trial to illustrate the effect of the invention, a tapered element was made from conventional, slightly corrugated paper, as before. The element was 45.6 cm long and its average diameter was 21.5 cm.

This element was assembled into a metal casing and tested at a throughput of 16.8 cubic meters/minute, starting with an initial pressure drop of 100 mm of water. When the pressure drop reached 500 mm of water, the element was found to contain 1440 grams of standard dust.

The above trial was repeated using paper indented accordingly to the invention; the actual total area of paper (number of pleats) had to be reduced by about 10% because of the increased and more uniform pleat separation achieved. Despite the large reduction in total paper area, the dust holding capacity rose to 1980 grams, an improvement of about 35%. This was entirely due to the use of the tapered indents of the invention, since the other test parameters (except paper area) were unchanged.

Figure 2:
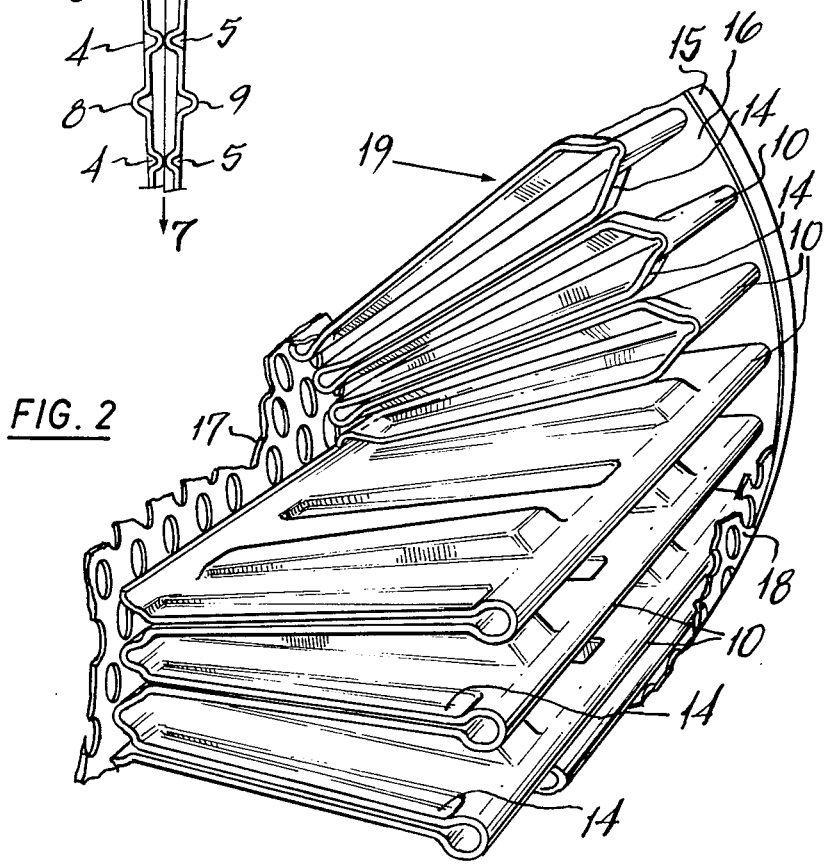

In order that the invention be better understood, it will now be described by way of example with reference to the accompanying drawing in which:

FIG. 1 is a diagrammatic cross-sectional view through two mutually facing pleat walls viewed generally radially of a tapered element, and FIG. 2 is a perspective view, partly in section, of part of another tapered element.

In FIG. 1, adjacent pleat walls 2 and 3 incorporate rows of pleat separation dimples 4 and 5 respectively, extending longitudinally of the pleat. As shown, the height of individual dimples is graduated from the base of the element 6 towards the apex 7. Likewise, rows of dimples 8, 9, projecting in the opposite direction to the dimples 4 and 5 are provided to space the pleat walls 2 and 3 from the adjacent walls (not shown). These are also graduated in height in exactly the same way as the dimples 4 and 5.

In FIG. 2, part of a tapered element 19 is shown in rather more detail. In this case, adjacent pleats 10, 11, are separated by tapered indents, 14, embossed into the filter paper. The base of the element is constituted by a metal end cap 15 to which the ends of the pleats are sealed by embedding them in a layer of an adhesive 16. Inner (17) and outer (18) perforated metal walls support the element 19 which tapers towards a smaller, but otherwise similar end cap (not shown) at the apex of the element. The height of the indents is graduated lengthwise of the pleats and also over their depth radially of the element. This element was the one compared with a conventional, tubular element, as described above.

I claim:

1. A paper filter frusto-conical element having a frusto-conical sloping wall with pleats extending lengthwise thereof, said pleats including dimples embossed into the paper from which the pleat is formed and arranged to abut an adjacent pleat for control of separation of adjacent pleats, the height of said dimples situated at positions spaced along said sloping wall being graduated lengthwise of the element so as to provide controlled pleat separation over at least most of the length of the filter element.

2. A pleated paper filter element according to claim 1, wherein the pleat separation dimples each have the form of a tapered indent comprising a continuous deformation extending over at least a major portion of the pleat depth to form a ridge whose height relative to the plane of the paper decreases progressively towards the bottom of the pleat.

3. A pleated paper filter element according to claim 2 wherein the pleat separation dimples which project from the plane of the paper in that direction which in use is towards the outer surface of the tapered element are tapered indents and those pleat separation dimples projecting from the plane of the paper in the opposite direction are of substantially constant height throughout the depth of any one pleat.

4. A pleated paper filter element according to claim 1 wherein the pleat separation dimples are formed so as to lie in crest-to-crest abutting relation when the paper is assembled into a filter element.

5. A pleated paper filter element according to claim 4 wherein the pleat separation dimples have a height of about 1 mm relative to the plane of the paper and their abutting regions are from 1 to 3 mm wide.

* * * * *